US 9,266,441 B2

(12) United States Patent
Abe et al.

(10) Patent No.: US 9,266,441 B2
(45) Date of Patent: Feb. 23, 2016

(54) CONTACTLESS POWER TRANSFER SYSTEM

(75) Inventors: Shigeru Abe, Saitama (JP); Tomio Yasuda, Saitama (JP); Ryouichi Yamanouchi, Aichi (JP); Akira Suzuki, Aichi (JP)

(73) Assignees: TECHNOVA INC., Tokyo (JP); National University Corporation SAITAMA UNIVERSITY, Saitama (JP)

( * ) Notice: Subject to any disclaimer, the term of this patent is extended or adjusted under 35 U.S.C. 154(b) by 255 days.

(21) Appl. No.: 13/980,001

(22) PCT Filed: Jan. 18, 2012

(86) PCT No.: PCT/JP2012/050968
§ 371 (c)(1),
(2), (4) Date: Jul. 16, 2013

(87) PCT Pub. No.: WO2012/099169
PCT Pub. Date: Jul. 26, 2012

(65) Prior Publication Data
US 2013/0293192 A1    Nov. 7, 2013

(30) Foreign Application Priority Data

Jan. 19, 2011  (JP) .................................. 2011-009299
Nov. 30, 2011  (JP) .................................. 2011-261614

(51) Int. Cl.
*B60L 11/18*  (2006.01)
*B60L 11/12*  (2006.01)
(Continued)

(52) U.S. Cl.
CPC ............. *B60L 11/182* (2013.01); *B60L 11/123* (2013.01); *B60L 11/14* (2013.01); *B60L 11/1803* (2013.01); *B60L 11/1814* (2013.01); *B60L 11/1824* (2013.01); *B60L 11/1833* (2013.01);
(Continued)

(58) Field of Classification Search
CPC ......... B60L 11/182; H01F 38/14; H02J 7/025
See application file for complete search history.

(56) References Cited

U.S. PATENT DOCUMENTS 6,281,660 B1    8/2001  Abe
6,548,985 B1 *  4/2003  Hayes et al. .................. 320/108
(Continued)

FOREIGN PATENT DOCUMENTS

CN    101461283 A    6/2009
JP    2000-217277 A   8/2000
(Continued)

OTHER PUBLICATIONS

Nagatsuka et al., "Compact Contactless Power Transfer System for Electric Vehicles", 2010 International Power Electronics Conference, pp. 807-813. Jun. 2010.*
(Continued)

*Primary Examiner* — Vuthe Siek
*Assistant Examiner* — Aric Lin
(74) *Attorney, Agent, or Firm* — Rothwell, Figg, Ernst & Manbeck, P.C.

(57) ABSTRACT

A half-bridge inverter is used for a high frequency alternating current power supply to be connected to a primary side of a contactless power transformer, and a voltage-doubler rectifier is used to convert a secondary-side alternating current output of the contactless power transformer into a direct current.

8 Claims, 12 Drawing Sheets

(51) Int. Cl.
  *B60L 11/14* (2006.01)
  *H02M 3/337* (2006.01)
  *H02M 7/217* (2006.01)
  *H01F 38/14* (2006.01)
  *H02J 7/02* (2006.01)
  *B60L 15/00* (2006.01)
  *H02J 5/00* (2006.01)
  *H02M 1/00* (2007.01)
  *B60M 7/00* (2006.01)

(52) U.S. Cl.
  CPC .............. *B60L15/007* (2013.01); *H01F 38/14* (2013.01); *H02J 7/025* (2013.01); *H02M 3/337* (2013.01); *H02M 7/217* (2013.01); *B60L 2210/10* (2013.01); *B60L 2210/30* (2013.01); *B60L 2210/40* (2013.01); *B60L 2220/54* (2013.01); *B60M 7/003* (2013.01); *H02J 5/005* (2013.01); *H02M 2001/007* (2013.01); *Y02T 10/6217* (2013.01); *Y02T 10/641* (2013.01); *Y02T 10/7005* (2013.01); *Y02T 10/7022* (2013.01); *Y02T 10/7077* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

2002/0021575 A1    2/2002   Yasumura
2006/0138099 A1*   6/2006   Namiki et al. ........... 219/121.43
2006/0176714 A1    8/2006   Yasumura
2007/0247122 A1   10/2007   Huang
2011/0254377 A1*  10/2011   Wildmer et al. .............. 307/104
2012/0056580 A1    3/2012   Kai et al.

FOREIGN PATENT DOCUMENTS

JP         2000217277  A  *   8/2000   .............. H02J 17/00
JP         2001-136667 A       5/2001
JP         2001136667  A  *   5/2001   ................ H02J 7/00
JP            3125344  U       9/2006
JP         2008-104295 A       5/2008
JP         2008104295  A  *   5/2008
JP         2010-197093 A       9/2010
JP         2010-233364 A      10/2010
JP         2010-288441 A      12/2010
WO         2010131732  A1     11/2010

OTHER PUBLICATIONS

Lu et al., "Bridgeless PFC implementation using one cycle control technique", Twentieth Annual IEEE Applied Power Electronics Conference and Exposition, pp. 812-817. Mar. 2005.*

International Search Report mailed Apr. 24, 2012 in PCT/JP2012/050968.

Liu Xiu Quan et al., "The Design and Experimental Research of Wireless Electrical Energy Transmission," Science Technology and Engineering magazine, May 2010 (with an English abstract) (2 pages).

Chen, et al., "Half-bridge Non-contact Power Supply Technology Research," Coal Mine Machinery magazine, vol. 31 No. 9, Sep. 2010 (with an English abstract) (2 pages).

Communication mailed Nov. 3, 2015 in corresponding EP Patent Application No. 12736602.9 (8 pages).

* cited by examiner

CONTACTLESS POWER TRANSFER SYSTEM

CROSS-REFERENCE TO RELATED APPLICATIONS

This application is 35 U.S.C. 371 National Phase Entry Application from PCT/JP2012/050968, filed Jan. 18, 2012, which claims the benefit of priority from Japanese Patent Application Nos. 2011-009299, filed Jan. 19, 2011 and 2011-261614, filed Nov. 30, 2011, the entire contents of which are incorporated herein by reference.

TECHNICAL FIELD

The present invention relates to a contactless power transfer system which contactlessly feeds a moving body such as an electric vehicle with power and has an object to improve a total efficiency during the power feeding.

BACKGROUND ART

A contactless power transfer device uses electromagnetic induction between a primary coil (power transmission coil) and a secondary coil (power reception coil) to supply power from the power transmission coil to the power reception coil. The contactless power transfer device may be used to charge a secondary battery which is mounted in an electric vehicle or a plug-in hybrid vehicle and it is expected that a demand for a contactless power transfer device for charging a vehicle will be increased in the near future.

In the case of a contactless power transfer device for charging a vehicle, a vehicle with a power reception coil mounted on a bottom surface of a floorboard comes to a stop at a position where the power reception coil is disposed directly on a power transmission coil provided on the ground to perform the contactless power feeding. However, due to misalignment of the power transmission coil and the power reception coil in a horizontal direction or variation in a gap length in a vertical direction, a coupling factor between the power transmission coil and the power reception coil varies.

The following Patent Literature 1 suggests a contactless power transfer system in which a change in a power feeding efficiency of the contactless power transformer (power transmission coil+power reception coil) is made to be small even when the coupling factor varies.

As illustrated in FIG. 14, the system includes a full-wave rectifier 161 which converts a commercial alternating current 164 (AC) into a direct current, a full-bridge inverter 163 which generates a high frequency alternating current from the direct current, a contactless power transformer 1410 which performs contactless power feeding, a full-wave rectifier 1471 which converts a secondary-side alternating current output into a direct current, and a load 1472 which is a secondary battery.

In this system, the commercial alternating current 164 is converted into the direct current by the full-wave rectifier 161; the high frequency alternating current is generated from the direct current by the full-bridge inverter 163 to be fed into the contactless power transformer 1410; and the secondary-side alternating current output is converted into the direct current by the full-wave rectifier 1471 to supply the power to the load 1472 (secondary battery).

CITATION LIST

Patent Literature

Patent Literature 1: Japanese Patent Application Laid-open No. 2010-288441

SUMMARY OF INVENTION

Problem to be Solved by the Invention

The contactless power transfer system is a system which supplies power so that a high total efficiency during the power feeding is specifically required.

In the conventional contactless power transfer system, a full-bridge inverter is used as a primary-side high frequency power supply and a full-wave rectifier is used as a secondary-side rectifier so that it is not desirable to improve the efficiency because many semiconductor elements are disposed in a path through which a current flows.

Further, in order to widely spread the contactless power transfer system for charging a vehicle, the cost needs to be lowered.

Further, in the contactless power feeding for a vehicle, due to the change in the coupling factor of the contactless power transformer caused by variation in a gap length and misalignment, a ratio of a primary voltage and a secondary voltage varies and thus a direct current output voltage of the secondary-side rectifier needs to be controlled. However, in the conventional contactless power transfer system, it is difficult to control the direct current output voltage of the secondary-side rectifier.

In order to control the direct current output voltage of the secondary-side rectifier, three methods are suggested as follows:

(1) to vary a direct current voltage which is input to a primary-side inverter, (2) to perform variable control on an output voltage in the primary-side inverter, and (3) to provide a device (for example, a DC-DC converter) which varies a voltage in the secondary side.

Even in the conventional contactless power transfer system, the output alternating current voltage of the full-bridge inverter varies by performing pulse width control on the full-bridge inverter. However, if this method is adopted, it is difficult to perform soft switching of the inverter and thus a switching loss of the inverter is increased, which lowers the efficiency.

Further, in the conventional contactless power transfer system, the commercial alternating current is rectified by the full-wave rectifier so that a high frequency current, which causes inductive interference, is generated and it is difficult to satisfy the high frequency suppression required by electric power companies.

The present invention has been made in an effort to provide a contactless power transfer system which is capable of increasing a total efficiency during the power feeding and lowering the cost, and easily controlling a secondary direct current output voltage.

Means for Solving Problem

The present invention is a contactless power transfer system, comprising a half-bridge inverter which is used for a high frequency alternating current power supply connected to a primary side of a contactless power transformer; and a voltage-doubler rectifier which is used to convert a secondary-side alternating current output of the contactless power transformer into a direct current.

In the contactless power transfer system, an alternating current output voltage of the half-bridge inverter is reduced to be a half of the alternating current output voltage of the conventional full-bridge inverter but the output voltage of a secondary-side voltage-doubler rectifier becomes two times as high as the output voltage of the conventional full-wave rectifier. Therefore, a voltage ratio between the input voltage to the inverter and the secondary-side direct current voltage becomes almost the same as a whole. The number of semiconductor elements which are used for the half-bridge inverter or the voltage-doubler rectifier is smaller than the number of semiconductor elements in the full-bridge inverter or the full-wave rectifier so that the cost can be reduced. Further, the voltage of the contactless power transformer drops to approximately a half of the conventional voltage so that the contactless power transfer system is advantageous in terms of insulation and reducing ferrite loss. Further, in the contactless power transfer system, the number of semiconductor elements which are present in a path through which the current flows in the half-bridge inverter (the current continuously flows) is one and the number of semiconductor which is present in a path through which the current flows (the current continuously flows) is also one in the voltage-doubler rectifier. Therefore, the power feeding efficiency is improved as compared with the conventional system which supplies the power by combination of the full-bridge inverter and the full-wave rectifier.

Further, the contactless power transfer system of the present invention comprises a high power factor boost rectifier which is used as a direct current power supply of the half-bridge inverter.

A high power factor boost rectifier converts the alternating current input voltage into the direct current output voltage and shapes the alternating current input voltage into a sine waveform so that harmonic problem may be avoided.

Further, in the contactless power transfer system of the present invention, as the high power factor boost rectifier, a bridgeless high power factor boost rectifier which does not have a bridge may be used.

Further, in the contactless power transfer system of the present invention, an output voltage of the voltage-doubler rectifier is adjusted by adjusting an output voltage of the high power factor boost rectifier.

That is, the input direct current voltage of the half-bridge inverter which is used as the high frequency alternating current power supply is changed to adjust the output voltage of the voltage-doubler rectifier.

Further, the contactless power transfer system of the present invention comprises a constant voltage control circuit which performs constant-voltage control on the high power factor boost rectifier having the output voltage of the half-bridge inverter or the voltage-doubler rectifier as a feedback input. A conduction ratio of the high power factor boost rectifier is controlled based on the output voltage of the constant voltage control circuit.

Further, the contactless power transfer system of the present invention comprises a constant current control circuit which performs constant current control on the high power factor boost rectifier having an output current of the half-bridge inverter or the voltage-doubler rectifier as a feedback input. A conduction ratio of the high power factor boost rectifier is controlled based on the output voltage of the constant current control circuit.

By such a method, the output voltage of the high power factor boost rectifier may be controlled and the output voltage of the voltage-doubler rectifier may be adjusted.

Further, in the contactless power transfer system of the present invention, a serial capacitor is connected to the primary side of the contactless power transformer and a parallel capacitor is connected between the secondary side and the voltage-doubler rectifier.

The contactless power transformer may be equivalent to an ideal transformer by connecting a capacitor as described above and the contactless power transformer may be easily designed.

Further, in the contactless power transfer system of the present invention, the primary side of the contactless power transformer is provided on the ground and the secondary side is provided in a moving body such as a vehicle, a carrier, and a moving robot.

Therefore, the power may be fed to the moving body without connecting the power supply to the moving body.

Further, in the contactless power transfer system of the present invention, an output of the voltage-doubler rectifier is connected to a secondary battery and a series of control required to charge the secondary battery is controlled by controlling the conduction ratio of the high power factor boost rectifier.

When the secondary battery which is mounted in the moving body is charged, the voltage is controlled by controlling the high power factor boost rectifier on the ground.

Further, in the contactless power transfer system of the present invention, the moving body in which the secondary side of the contactless power transformer is provided includes a first power converter having a function of converting a direct current into an alternating current and a function of converting the alternating current into the direct current, a secondary battery which is charged by the direct current converted by the first power converter, two capacitors which are interposed between the secondary battery and the first power converter, and a rotating electrical machine which is driven by the alternating current converted by the first power converter. The first power converter includes at least one of switching unit arms in which two switching units formed of a semiconductor switching element and a freewheeling diode are connected in series. When the secondary battery is charged by the secondary-side alternating current output of the contactless power transformer, semiconductor switching elements of all switching units which constitute the first power converter are off, and a voltage-doubler rectifier is formed by a freewheeling diode of the two switching units which are connected in series and the two capacitors.

As described above, a power converter which drives a rotating electrical machine of a vehicle is used to configure the voltage-doubler rectifier, which may reduce the cost.

Further, the contactless power transfer system of the invention comprises a second power converter, which is capable of boosting and dropping a direct current voltage, provided between the secondary battery and the two capacitors. The first power converter converts the direct current output of the secondary battery into the alternating current to drive the rotating electrical machine, the second power converter boosts the direct current voltage of the secondary battery to output the boosted direct current voltage to the first power converter and when the secondary battery is charged, the second power converter drops the direct current voltage output from the voltage-doubler rectifier in accordance with a remaining battery level of the secondary battery to output the direct current voltage to the secondary battery.

By doing this, it is possible to control the charging of the secondary battery which is mounted in the vehicle.

Effect of the Invention

According to the contactless power transfer system of the present invention, the total power feeding efficiency may be increased as compared with the conventional system. Further, the cost may be reduced. Furthermore, the high power factor boost rectifier is used so that the harmonic wave is not generated and the connectivity with the commercial power supply is good. The voltage is easily controlled when the secondary-side secondary battery is charged.

MODE FOR CARRYING OUT THE INVENTION

First Exemplary Embodiment

Figure 1:
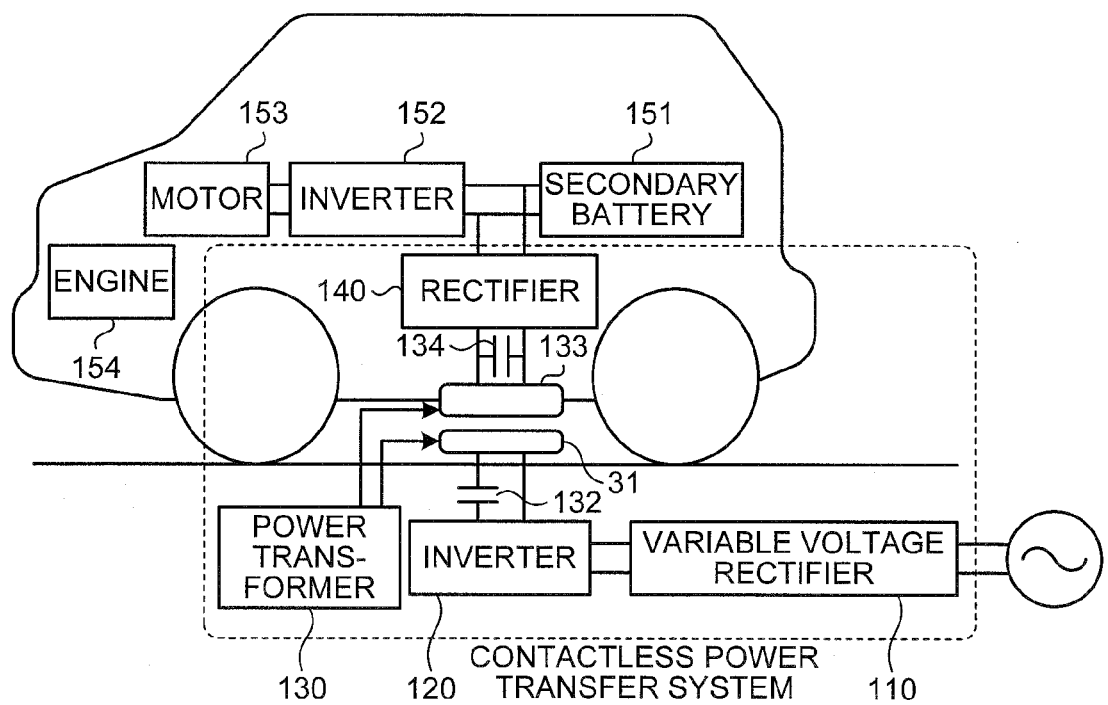
FIG. 1 is a diagram illustrating an example of charging a secondary battery of a vehicle by a contactless power transfer system according to the present invention.

FIG. 1 schematically illustrates an example when a contactless power transfer system according to the present invention is used to charge a plug-in hybrid vehicle.

The plug-in hybrid vehicle which is charged has an engine 154 and a motor 153 mounted as a driving source and includes a secondary battery 151 which is a power supply for the motor and an inverter 152 which converts a direct current of the secondary battery into an alternating current to supply the alternating current to the motor.

The contactless power transfer system which feeds the secondary battery 151 with power includes a variable voltage rectifier 110 which converts an alternating current of the commercial power supply into a direct current and varies a voltage thereof, an inverter 120 which generates a high frequency alternating current from the direct current, a power transmission coil 131 which is one of a contactless power transformer 130, and a serial capacitor 132 which is connected with the power transmission coil in series, on the ground and further includes a power reception coil 133 which is the other one of the contactless power transformer 130, a rectifier 140 which converts the alternating current into the direct current for the secondary battery 151, and a parallel capacitor 134 which is connected in parallel between the power reception coil 133 and the rectifier 140, on the vehicle.

Figure 2:
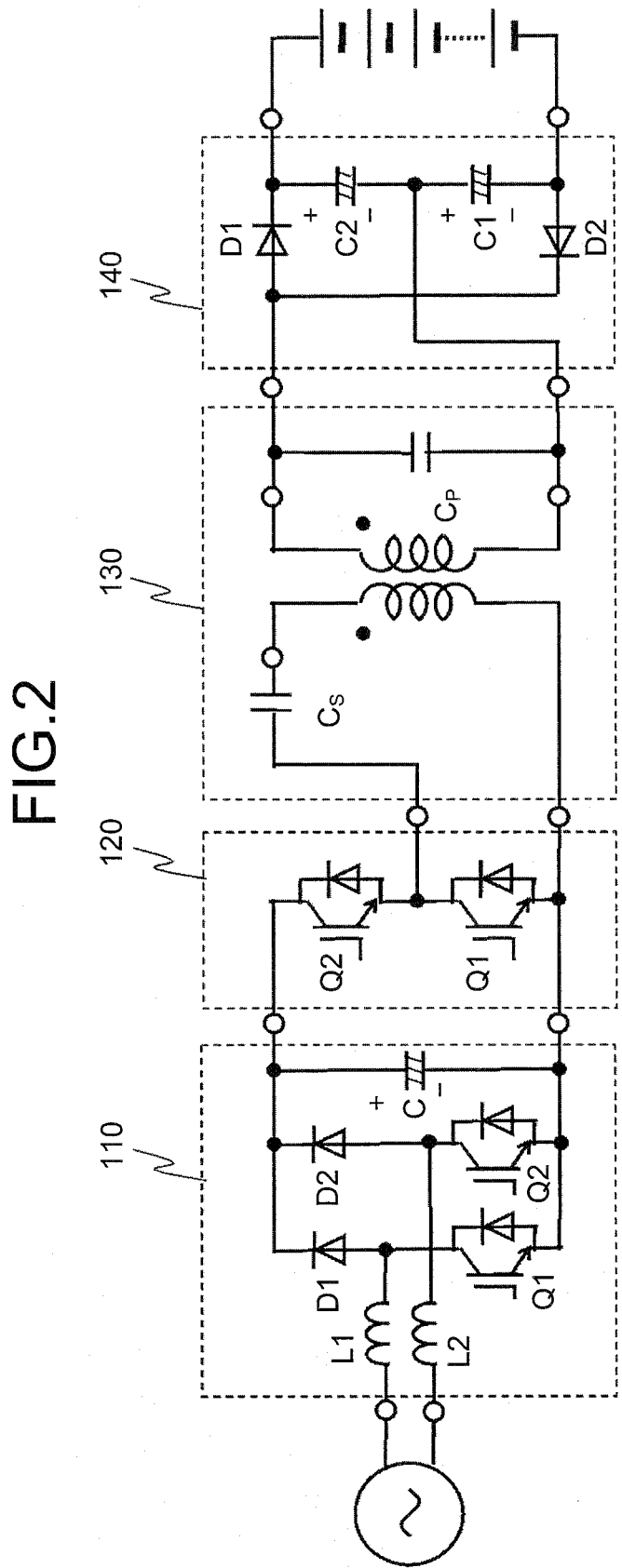
FIG. 2 is a basic circuit diagram of a contactless power transfer system according to a first exemplary embodiment of the present invention.

FIG. 2 illustrates a circuit diagram of the contactless power transfer system.

The variable voltage rectifier 110 is configured by a bridgeless high power factor boost rectifier (Bridgeless pfc boost rectifiers) 110 which does not have a bridge. The bridgeless high power factor boost rectifier is used as a rectifier for a home air-conditioner and includes two switching units Q1 and Q2 which include a semiconductor switching element such as an IGBT (Insulated Gate Bipolar Transistor) element and a fly-wheel diode (a freewheeling diode which is inserted to prevent the semiconductor switching element from being broken when a large reverse voltage is applied to the semiconductor switching element) as a power semiconductor switch. The bridgeless high power factor boost rectifier further includes two diodes D1 and D2, two reactors L1 and L2, and one smoothing capacitor C.

One arm to which the switching unit Q1 and the diode D1 are connected in series is connected in parallel to the other arm to which the switching unit Q2 and the diode D2 are connected in series. In contrast, the smoothing capacitor C is connected thereto in parallel. Connection points of the switching units Q1 and Q2 and the diodes D1 and D2 of each arm are connected to the commercial alternating current power supply through the reactors L1 and L2.

In the bridgeless high power factor boost rectifier 110, the reactor L1, the switching unit Q1, the diode D1, and the capacitor C form a first boost chopper and the reactor L2, the switching unit Q2, the diode D2, and the capacitor C form a second boost chopper. Switching elements of Q1 and Q2 are PWM (Pulse Width Modulation)—controlled by a control unit (not illustrated) and the PWM control is appropriately performed to convert the commercial alternating current voltage into a predetermined direct current output voltage by two sets of boost choppers and shape the alternating current input current into a sine waveform.

Further, a control circuit of the bridgeless high power factor boost rectifier 110 will be described below.

As the inverter 120 which generates the high frequency alternating current from the direct current output by the bridgeless high power factor boost rectifier 110, a half-bridge inverter 120 which has two switching units Q1 and Q2 as power semiconductor switches is adopted. In the half-bridge inverter 120, both ends of a switching module arm to which two switching units Q1 and Q2 are connected in series are connected to the smoothing capacitor C of the bridgeless high power factor boost rectifier 110 and a central point of the switching module arm and an end of the switching unit Q2 of the lower arm are connected to the primary-side circuit of the contactless power transformer 130.

The switching elements of the switching units Q1 and Q2 are alternately turned on/off at a high frequency cycle in response to the control signal from the controller (not illustrated). When Q1 is turned on and Q2 is turned off, the direct current output of the bridgeless high power factor boost rectifier 110 which passes through Q1 is supplied to a primary circuit of the contactless power transformer 130 and a forward current flows in the primary circuit. In contrast, when Q1 is turned off and Q2 is turned on, a reverse direction current flows in a closed circuit which connects the primary circuit of the contactless power transformer 130 and Q2. Therefore, by switching Q1 and Q2, the high frequency alternating current is output from the half-bridge inverter 120 to the contactless power transformer 130.

The output voltage of the half-bridge inverter 120 is a voltage at a central point of the switching unit arm, which is approximately a half of the voltage at both ends of the bridgeless high power factor boost rectifier 110. Further, the output voltage of the half-bridge inverter 120 is approximately a half of the alternating current output voltage when the alternating current is generated using the full-bridge inverter which includes four power semiconductor switches.

The contactless power transformer 130 is configured by a primary-side power transmission coil and a secondary-side power reception coil, the series capacitor Cs is connected to the power transmission coil and the parallel capacitor Cp is connected to the power reception coil. When the series capacitor Cs is connected to the power transmission coil and the parallel capacitor Cp is connected to the power reception coil as described above, a capacitance of each capacitor is selected so that the contactless power transformer is equivalent to an ideal transformer. Therefore, the contactless power transformer may be easily designed.

A voltage-doubler rectifier 140 is used as the rectifier 140 which converts the alternating current received from the secondary side into a direct current. The voltage-doubler rectifier 140 includes a capacitor arm in which two capacitors C1 and C2 are connected to each other in series and two diodes D1 and D2. The diode D1 is inserted between one end of the secondary-side circuit of the contactless power transformer 130 and one end of a upper arm of the capacitor arm so as to make the capacitor arm the forward side and the diode D2 is inserted between one end of the secondary-side circuit of the contactless power transformer 130 and an end of a lower arm of the capacitor arm so as to make the contactless power transformer 130 the forward side. Further, the central point of the capacitor arm is connected to the other end of the secondary-side circuit of the contactless power transformer 130 and both ends of the capacitor arm are connected to both ends of the secondary battery.

In the voltage-doubler rectifier 140, if one end of the secondary-side circuit to which the diodes D1 and D2 of the contactless power transformer 130 are connected has a positive voltage, the capacitor C1 is charged by a circuit which connects the one end of the secondary-side circuit, the diode D1, the capacitor C1, and the other end of the secondary-side circuit. In contrast, if the other end of the secondary-side circuit of the contactless power transformer 130 has a positive voltage, the capacitor C2 is charged by a circuit which connects the other end of the secondary-side circuit, the capacitor C2, the diode D1, and the one end of the secondary-side circuit. A direct current voltage to which charged voltages of capacitors C1 and C2 are added in series is applied to the secondary battery.

Therefore, a direct current voltage which is almost two times as high as an alternating current voltage input from the contactless power transformer 130 is output from the voltage-doubler rectifier 140.

As described above, in the contactless power transfer system, the alternating current output voltage of the half-bridge inverter 120 drops a half of the output of the full-bridge inverter. However, since the voltage-doubler rectifier 140 boosts the output voltage to two times as high as the output of the full-wave rectifier, the voltage which is supplied to the secondary battery becomes the same as that of the conventional contactless power transfer system which includes the full-bridge inverter and the full-wave rectifier.

The number of power semiconductor switches which are used in the half-bridge inverter 120 is a half of the number of switches used in the full-bridge inverter and the number of diodes which are used in the voltage-doubler rectifier 140 is half of the number of diodes used in the full-wave rectifier. Therefore, the contactless power transfer system may reduce the cost.

Further, in the contactless power transfer system, the current alternately flows in the two power semiconductor switches of the half-bridge inverter 120 so that the number of power semiconductor switches in which the current flows is normally one. To the contrary, in the full-bridge inverter, the current always flows in two power semiconductor switches. Therefore, the power which is consumed in the power semiconductor switch of the half-bridge inverter is lower than that of the full-bridge inverter and thus the power feeding efficiency may be correspondingly increased.

Further, similarly to the voltage-doubler rectifier 140, in the voltage-doubler rectifier, the number of diodes in which the current flows is always one and thus the power consumption is lower than that of the full-wave rectifier in which the current always flows in two diodes, which may increase the power feeding efficiency.

Further, the alternating current voltage output from the half-bridge inverter 120 is input to the contactless power transformer 130 so that the voltage of the contactless power transformer 130 is approximately a half of that of the conventional contactless power transformer. The ferrite is used for a core of the contactless power transformer and a magnetic flux density in the ferrite is proportional to the voltage so that an iron loss of the ferrite is reduced by lowering the voltage. Further, a risk of insulation breakdown is also reduced.

As described above, the contactless power transfer system has the following advantages, as compared with the conventional contactless power transfer system:

(1) the power feeding efficiency is several % increased.
(2) the cost may be reduced.
(3) the commercial alternating current voltage is converted into the direct current using a high power factor boost rectifier which does not generate the harmonic wave so that the connectivity with the commercial power supply is good.

Figure 3:
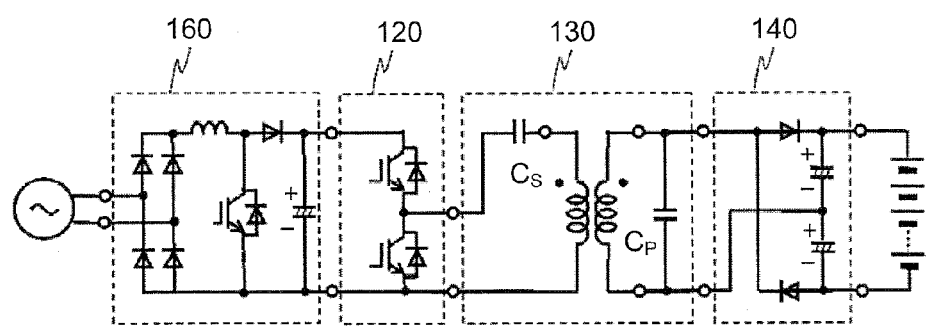
FIG. 3 is a first modified circuit diagram of the contactless power transfer system of FIG. 2.

Further, in this exemplary embodiment, even though the bridgeless high power factor boost rectifier is used as the high power factor boost rectifier, as illustrated in FIG. 3, a high power factor boost rectifier 160 which includes a bridge and one set of boost choppers may be used.

Figure 4:
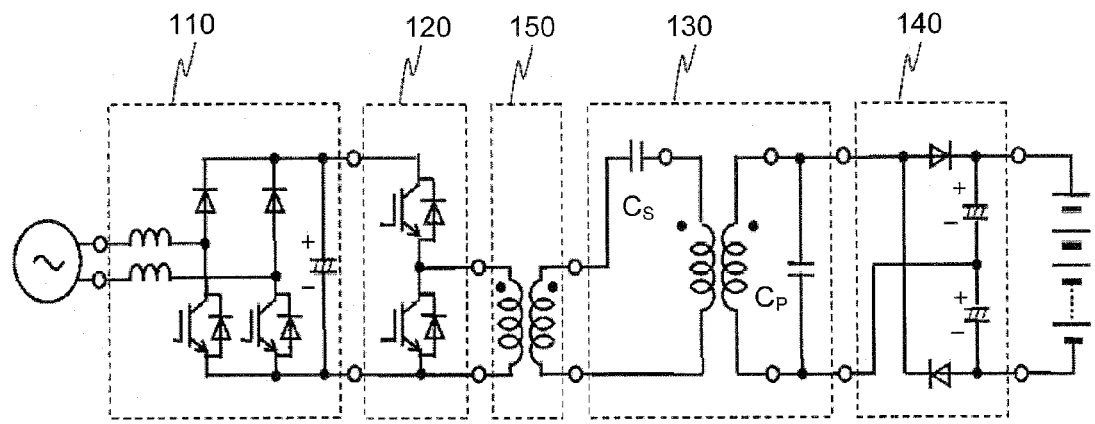
FIG. 4 is a second modified circuit diagram of the contactless power transfer system of FIG. 2.

Further, as illustrated in FIG. 4, a transformer 150 may be interposed between the half-bridge inverter 120 and the contactless power transformer 130. The transformer 150 insulates between the half-bridge inverter 120 and the contactless power transformer 130 to change a voltage ratio or a current ratio therebetween.

Next, a control circuit of the bridgeless high power factor boost rectifier 110 will be described.

In the contactless power transfer system, the output voltage of the half-bridge inverter 120 may be controlled to adjust the output voltage of the voltage-doubler rectifier 140 which is applied to the secondary battery. In order to control the output voltage of the half-bridge inverter 120, the bridgeless high power factor boost rectifier 110 is controlled to vary the direct current voltage which is input to the half-bridge inverter 120.

Figure 5:
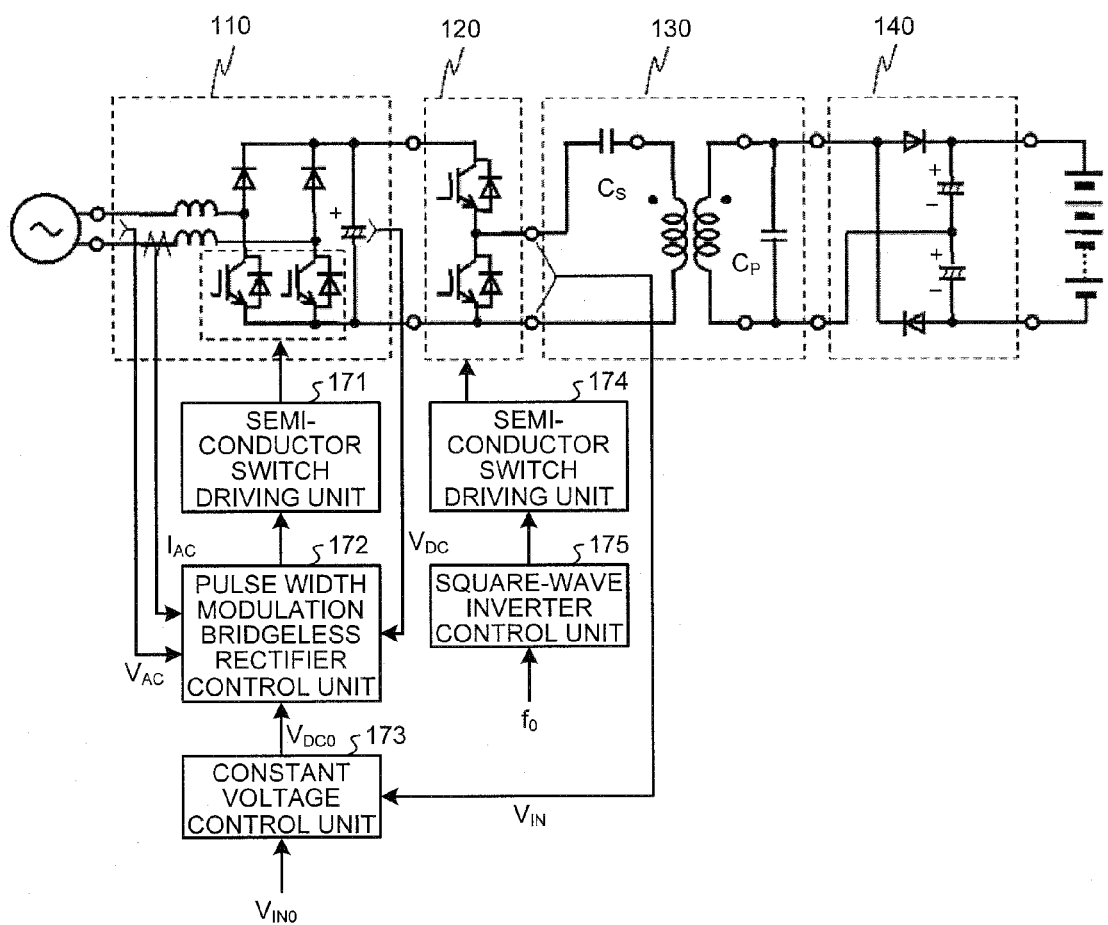
FIG. 5 is a diagram of a first control circuit configuration of the contactless power transfer system of FIG. 2.

The configuration of the control circuit is illustrated in FIG. 5.

The control circuit includes a semiconductor switch driving unit 171 which drives to turn on/off the power semiconductor switch of the bridgeless high power factor boost rectifier 110, a pulse width modulation bridgeless rectifier control unit 172 which controls an operation of the semiconductor switch driving unit, and a constant voltage control unit 173 which performs constant-voltage control on the bridgeless high power factor boost rectifier 110. Further, as a control mechanism of the half-bridge inverter 120, the control circuit includes a semiconductor switch driving unit 174 which drives to turn on/off the power semiconductor switch of the half-bridge inverter 120 and a square-wave inverter control unit 175 which controls the operation of the semiconductor switch driving unit based on a frequency $f_0$.

The constant voltage control unit 173 feedback-inputs an output voltage $V_{IN}$ of the half-bridge inverter 120 and compares the reference voltage $V_{IN0}$ with $V_{IN}$ to control the pulse width modulation bridgeless rectifier control unit 172. The pulse width modulation bridgeless rectifier control unit 172 controls the operation of the semiconductor switch driving unit 171 so as to change a conduction ratio (duty) of the bridgeless high power factor boost rectifier 110 in accordance with the instruction of the constant voltage control unit 173 with reference to an input voltage $V_{AC}$, an input current $I_{AC}$, and an output voltage $V_{DC}$ of the bridgeless high power factor boost rectifier 110.

As described above, the bridgeless high power factor boost rectifier 110 is controlled to vary the direct current voltage which is input to the half-bridge inverter 120 to adjust the direct current output voltage of the voltage-doubler rectifier 140.

Figure 6:
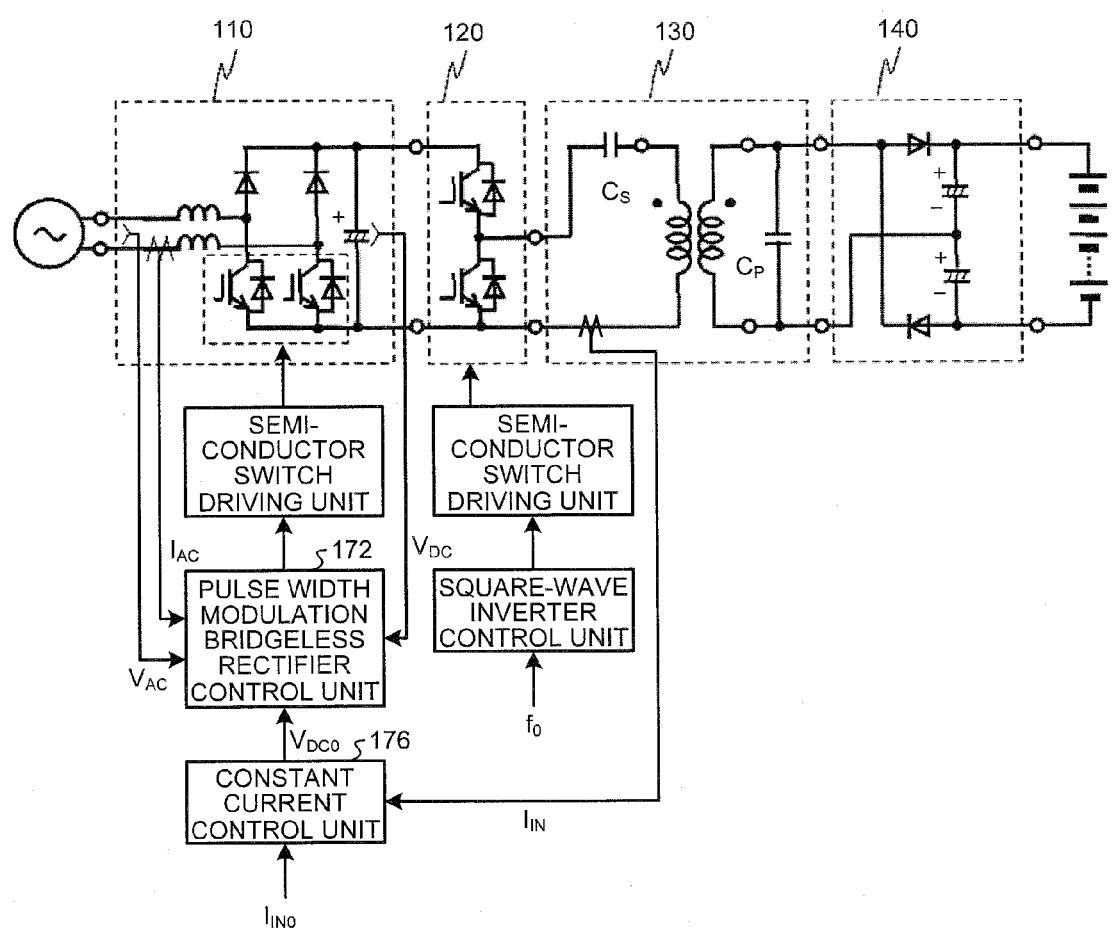
FIG. 6 is a diagram of a second control circuit configuration of the contactless power transfer system of FIG. 2.

Further, the control circuit illustrated in FIG. 6 includes a constant current control unit 176 which performs constant-current control on the bridgeless high power factor boost rectifier 110 instead of the constant voltage control unit 173 of FIG. 5. Therefore, the constant current control unit 176 feedback-inputs the output current $I_{IN}$ of the half-bridge inverter 120 to compare the reference current $I_{IN0}$ with $I_{IN}$ to control the pulse width modulation bridgeless rectifier control unit 172. Other configurations are same as those of FIG. 5.

Figure 7:
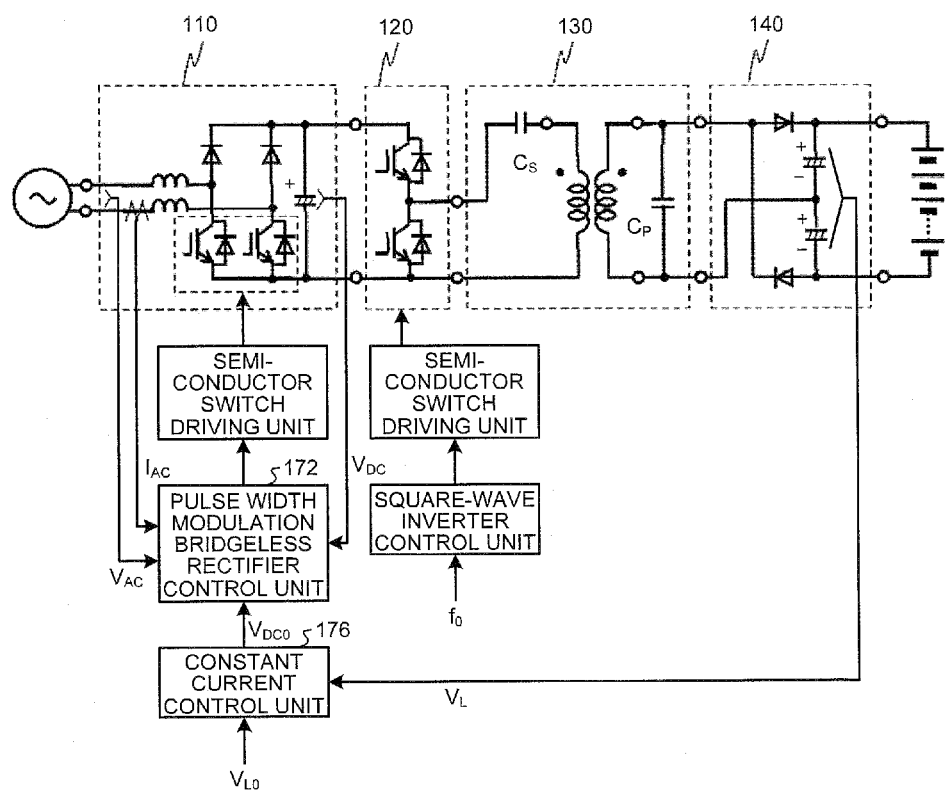
FIG. 7 is a diagram of a third control circuit configuration of the contactless power transfer system of FIG. 2.

Further, in the control circuit illustrated in FIG. 7, the constant voltage control unit 173 feedback-inputs an output voltage $V_L$ of the voltage-doubler rectifier 140 to compare a reference voltage $V_{L0}$ with $V_L$ and controls the pulse width modulation bridgeless rectifier control unit 172. Other configurations are same as those of FIG. 5.

Further, the constant current control unit 176 of FIG. 6 may feedback-input the output current of the voltage-doubler rectifier 140, similarly to the control circuit of FIG. 7, to control the pulse width modulation bridgeless rectifier control unit 172.

Figure 8:
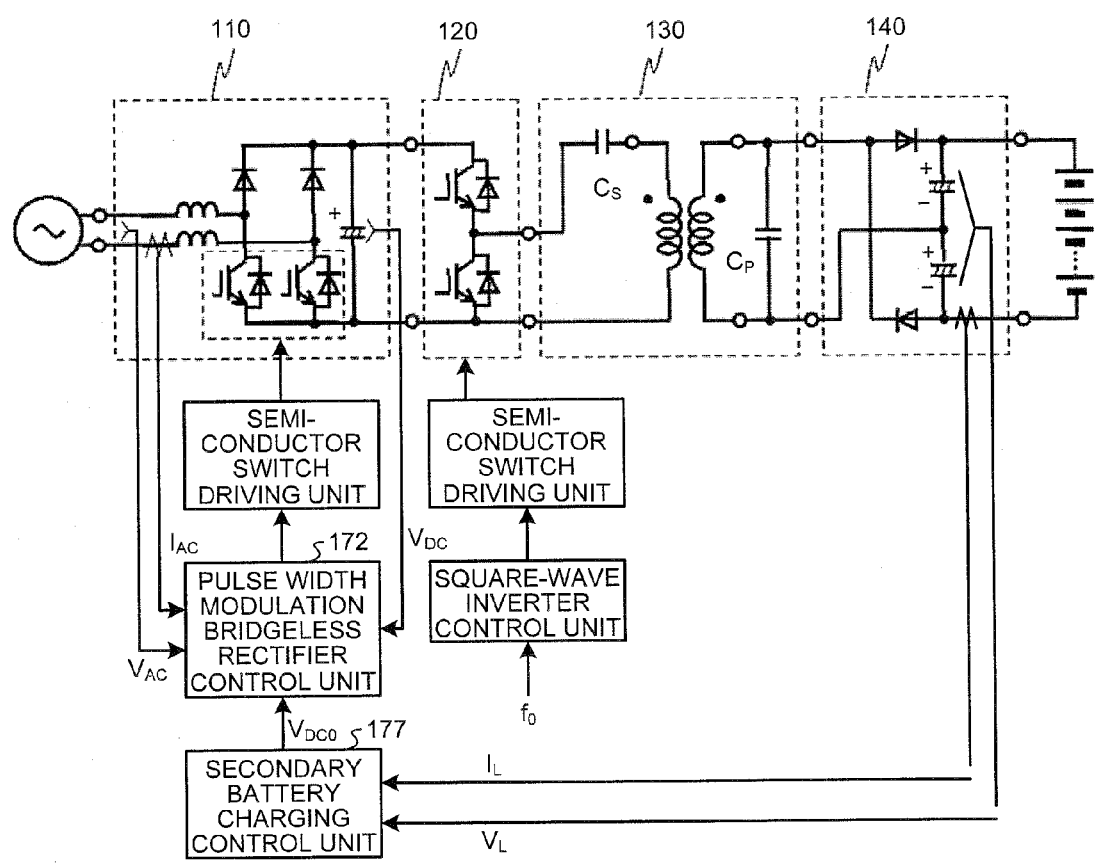
FIG. 8 is a diagram of a fourth control circuit configuration of the contactless power transfer system of FIG. 2.

Further, a control circuit illustrated in FIG. 8 includes a secondary battery charging control unit 177 which feedback-inputs the output voltage $V_L$ and the output current $I_L$ of the voltage-doubler rectifier 140 to control the pulse width modulation bridgeless rectifier control unit 172, instead of the constant voltage control unit 173 of FIG. 5. Other configurations are same as those of FIG. 5.

As described above, in the contactless power transfer system, the bridgeless high power factor boost rectifier 110 is controlled to vary the direct current voltage which is input to the half-bridge inverter 120 and thus the output voltage of the half-bridge inverter 120 is controlled to adjust the output voltage of the voltage-doubler rectifier 140.

Figure 9:
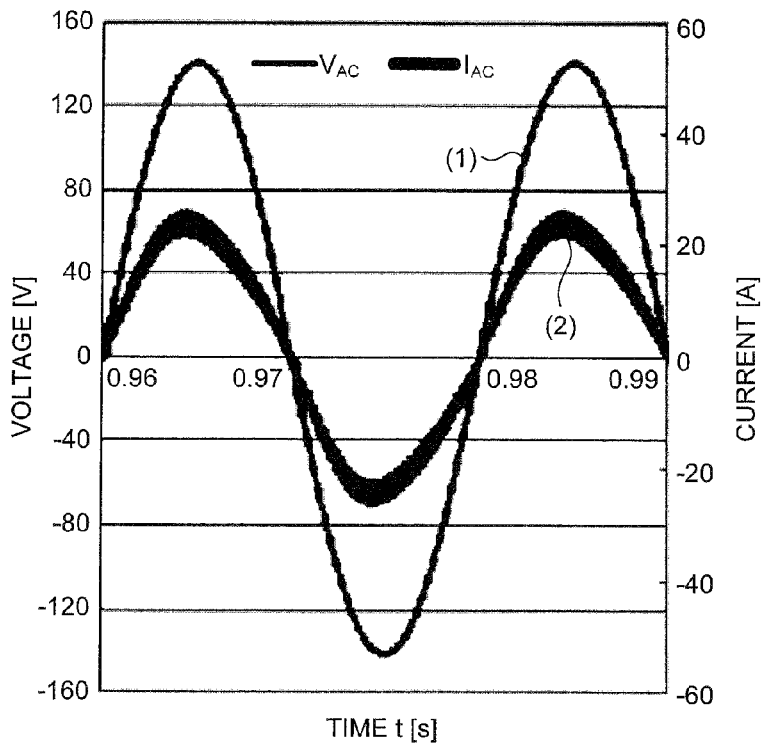
FIG. 9 is a diagram illustrating a simulation waveform of an input voltage and an input current of a bridgeless high power factor boost rectifier.

FIG. 9 illustrates a simulation waveform of the input voltage $V_{AC}$ (1) and the input current $I_{AC}$ (2) of the bridgeless high power factor boost rectifier 110. A power factor is 99% or higher and the input current $I_{AC}$ is almost a sine wave and has a little harmonic wave.

Figure 10:
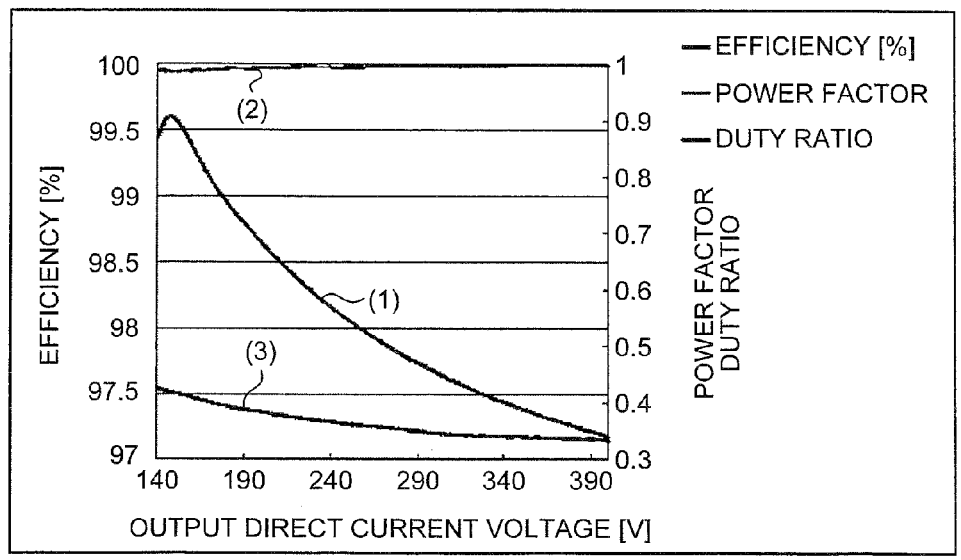
FIG. 10 is a diagram illustrating a variable range of an output voltage when a duty ratio of the bridgeless high power factor boost rectifier is changed.

Further, FIG. 10 illustrates a range where the output voltage of the bridgeless high power factor boost rectifier 110 is variable by changing a duty ratio of the bridgeless high power factor boost rectifier 110. In FIG. 9, (1) represents a duty ratio, (2) represents a power factor, and (3) represents an efficiency (%).

If a conduction ratio (duty) d of the pulse width modulation varies 0.9 to 0.34 when $V_{AC}=100$ V, the output voltage $V_D$ of the bridgeless high power factor boost rectifier 110 varies in the range of 140 V to 400 V.

As described above, in the contactless power transfer system, an output voltage of the bridgeless high power factor boost rectifier 110 installed on the ground varies to easily adjust the output voltage of the voltage-doubler rectifier 140 which is applied to the secondary battery.

Second Exemplary Embodiment

In the second exemplary embodiment, a vehicle driving device which receives power using the contactless power transfer system of the first exemplary embodiment will be described.

Figure 11:
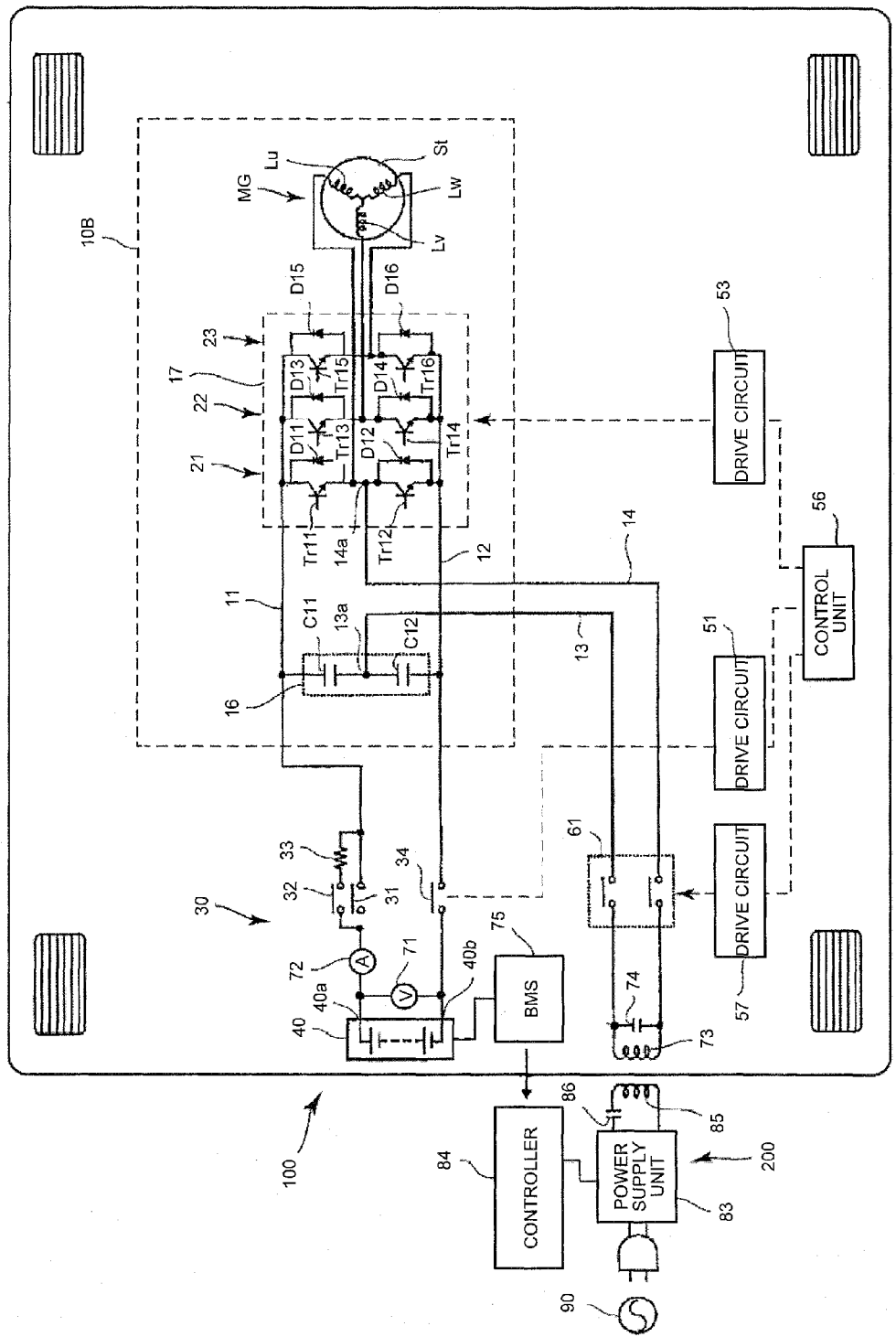
FIG. 11 is a diagram illustrating a vehicle driving apparatus corresponding to a contactless power transfer system according to a second exemplary embodiment of the present invention.

FIG. 11 schematically illustrates the vehicle driving device.

A vehicle 100 includes a battery 40 which is charged by the contactless power transfer system, a voltage sensor 71 which detects a voltage of the battery 40, a current sensor 72 which detects a current of the battery 40, a BMS (Battery Management System) 75 which monitors a charging status of the battery 40, a vehicle driving device 10B which drives a rotary electricity (motor generator MG) by the power of the battery 40, a cut-off circuit 30 which is interposed between the battery 40 and the vehicle driving device 10B, a power reception coil 73 which receives the power from a power transmission coil 85 of a ground-side device 200 of the contactless power transfer system, a capacitor 74 which is connected in parallel to the power reception coil 73, and a switch circuit 61 which cuts off the power feeding from the power reception coil 73.

The vehicle driving device 10B includes a capacitor arm 16 in which two smoothing capacitors C11 and C12 are connected in series, an inverter 17, and a motor generator MG. The inverter 17 includes three switching unit arms 21, 22, and 23 in which two sets of switching units formed of semiconductor switching elements Tr1, Tr2, Tr3, Tr4, Tr5, and Tr6 and freewheeling diodes D11, D12, D13, D14, D15, and D16 are connected in series. Each of three phase stator coils Lu, Lv, and Lw of the motor generator MG is connected between two switching units of each of the switching unit arms 21, 22, and 23.

An end of the power reception coil 73 is connected to a central point of the capacitor arm 16 through the switch circuit 61 and an alternating current line 13 and the other end of the power reception coil 73 is connected between the switching units of the switching unit arm 21 of the inverter 17 through the switch circuit 61 and an alternating current line 14.

Further, in the vehicle, a drive circuit 57 which drives the switch circuit 61, a drive circuit 51 which drives the cut-off circuit 30, a drive circuit 53 which switches the semiconductor switching element of the inverter 17, and a control unit 56 which controls the drive circuits are provided.

Further, the cut-off circuit 30 includes a relay 31 which is connected to a positive terminal 40a of the battery 40, an auxiliary relay 32 and a resistor 33 which are connected to the relay 31 in parallel, and a relay 34 which is connected to a negative terminal 40b of the battery 40 and the relays 31, 32, and 34 are operated by the drive circuit 51.

The ground-side device 200 of the contactless power transfer system includes a power supply unit 83 which is connected to a commercial power supply 90 to generate a high frequency alternating current, a capacitor 86 which is connected to the power transmission coil 85 in series, and a controller (power supply control unit) 84 which controls the power output from the power supply unit 83. The power supply unit 83 includes the bridgeless high power factor boost rectifier 110 and the half-bridge inverter 120 of FIG. 2.

When the battery 40 is charged from the ground-side device 200 in a contactless power feeding manner, the vehicle stops so as to face the power transmission coil 85 and the power reception coil 73 each other, the drive circuit 57 drives to connect the switch circuit 61, the drive circuit 51 drives to connect the cut-off circuit 30, and the drive circuit 53 drives to set the semiconductor switching element of each switching unit of the inverter 17 to be turned off.

In the inverter 17 in which the semiconductor switching element of each switching unit is turned off, only freewheeling diodes D11 and D12 which are included in two switching units of the switching unit arm 21 act on the alternating current which is input from the power reception coil 73.

Figure 12:
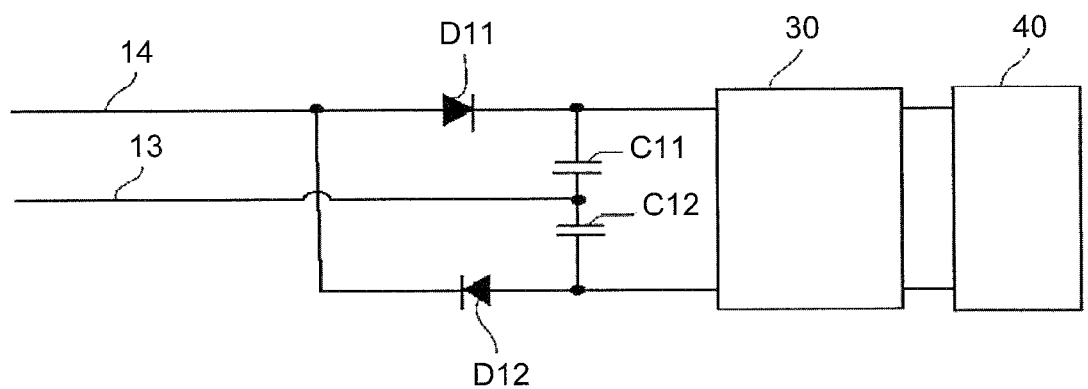
FIG. 12 is a diagram illustrating a double rectifying circuit which is implemented when a semiconductor switching element of a switching unit is turned off.

Therefore, as illustrated in FIG. 12, the voltage-doubler rectifying circuit is formed by two capacitors C11 and C12 of the capacitor arm 16, two freewheeling diodes D11 and D12 of the inverter 17 and the battery 40 is charged by the circuit of FIG. 2.

The BMS 75 which monitors the charging status of the battery 40 calculates a remaining battery level (SOC) of the battery 40 based on a voltage detected by the voltage sensor 71 and a current detected by the current sensor 72. A charging current command value which is generated based on the remaining battery level and a data signal indicating a current to the battery 40 detected by the current sensor 72 are transmitted to the controller 84 of the ground-side device 200. The controller 84 which receives these data signals adjusts the alternating current output from the power supply unit 83 so as to compensate a difference between a current which is supplied to the battery 40 and a charging current command value. By doing this, the current which is supplied to the battery 40 becomes close to the charging current command value and the charging voltage to the battery 40 is adjusted.

Further, if the motor generator MG runs with the power of the battery 40, the drive circuit 57 sets the switch circuit 61 to be turned off and the drive circuit 51 connects the cut-off circuit 30 to output the direct current voltage of the battery 40 to the inverter 17. The drive circuit 53 performs PWM control on each of the semiconductor switching elements of the inverter 17 so as to convert the direct current power input to the inverter 17 into a three phase alternating current power.

By doing this, the inverter 17 converts the direct current power into the three phase alternating current power to output the three phase alternating current power to the motor generator MG and the motor generator MG runs with the power to drive a drive wheel which is not illustrated.

Next, an example when the motor generator MG is regenerated will be described. The three phase alternating current power which is generated by the motor generator MG at the time of regenerative braking is output to the inverter 17.

The control unit 56 performs PWM control on each of the semiconductor switching elements of the inverter 17 through the drive circuit 53 such that the inverter 17 converts the three phase alternating current power into the direct current power. By doing this, the inverter 17 converts the three phase alternating current power into the direct current and outputs the converted direct current power to direct current lines 11 and 12. The converted direct current power is smoothened by the capacitors C11 and C12 to be supplied to the battery 40.

As described above, in the vehicle device, in order to charge the battery 40, the contactless power feeding is performed by the circuit of FIG. 2. The motor generator MG rotates by the power stored in the battery 40 and the alternating current power which is generated by the motor generator MG at the time of regenerative braking is converted into the direct current to be stored in the battery 40.

Figure 13:
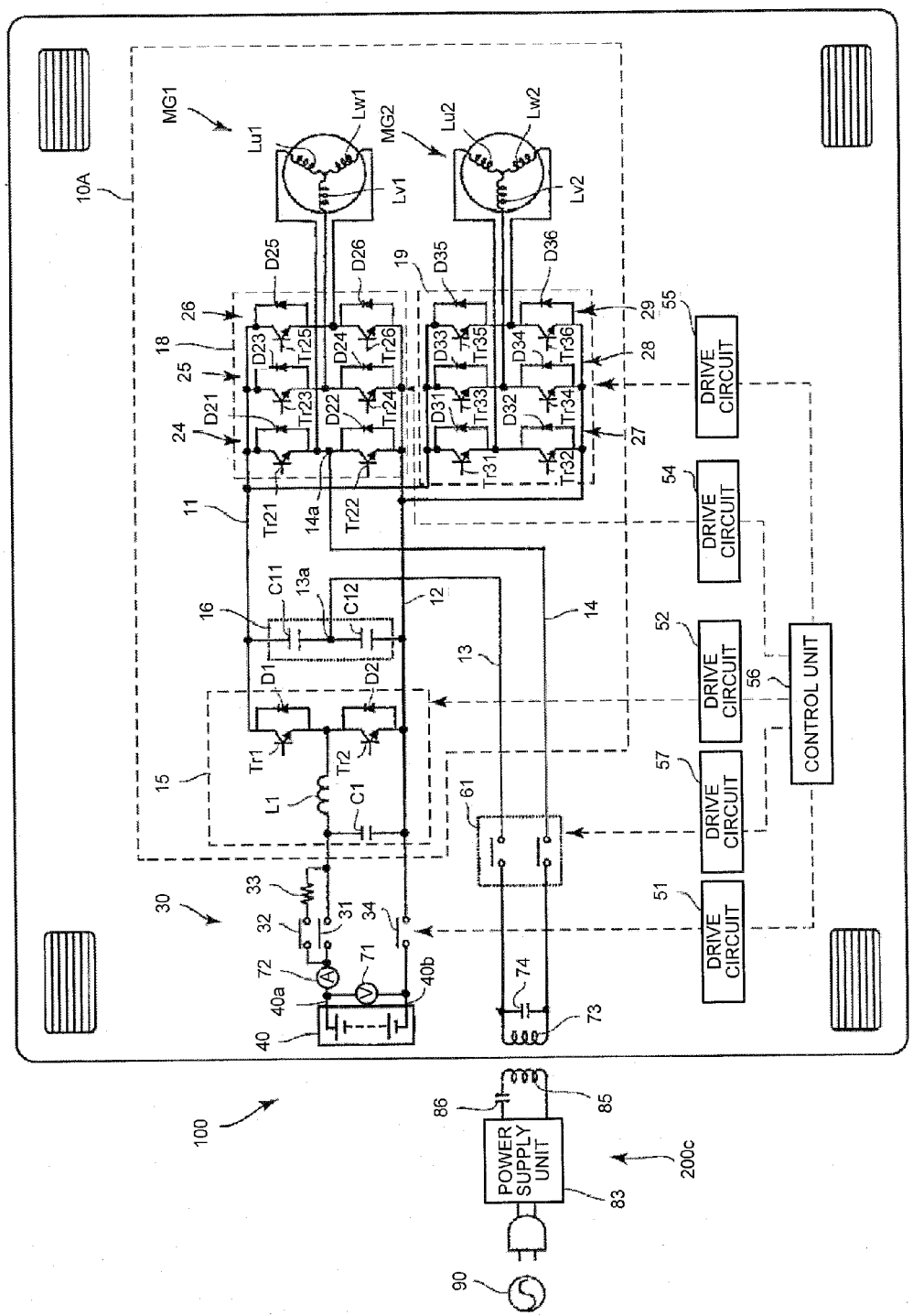
FIG. 13 is a diagram illustrating a modification embodiment of the vehicle driving apparatus of FIG. 11.
Figure 14:
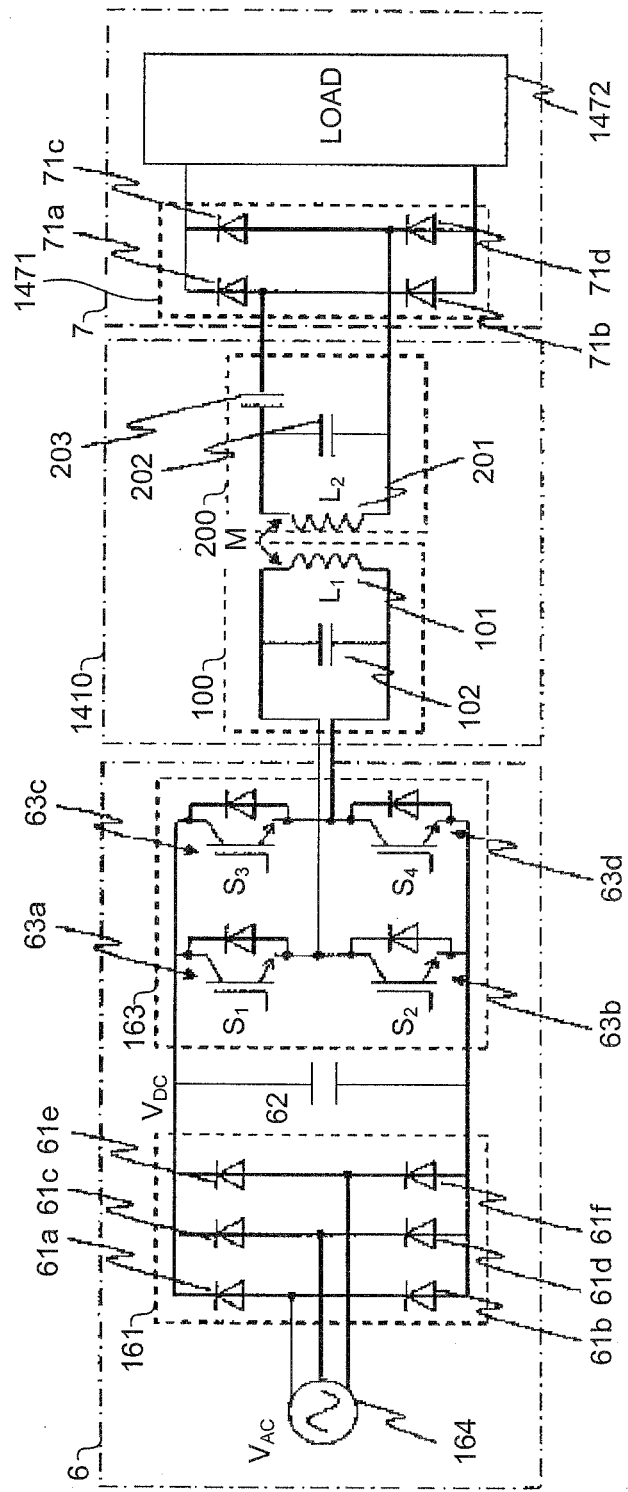
FIG. 14 is a diagram illustrating a conventional contactless power transfer system.

FIG. 13 illustrates a modification embodiment of FIG. 11. The vehicle has two motor generators MG and two inverters 18 and 28 which drive the motor generators. A first motor generator MG1 operates as a generator which is driven by an engine which is an internal combustion engine, but is not illustrated and also operates as an electric motor which starts the engine. A second motor generator MG2 operates as an electric motor which drives a driving wheel of the vehicle which is not illustrated, and also operates as a generator at the time of regenerative braking.

A DC-DC converter 15 formed of a switching unit arm in which two switching units formed of the semiconductor switching elements Tr1 and Tr2 and freewheeling diodes D1 and D2 are connected in series, one reactor L1, and one capacitor C1 is provided between the capacitor arm 16 and the battery 40. The switching unit arm of the DC-DC converter 15 is connected to the capacitor arm 16 in parallel and the capacitor C1 is connected to the battery 40 in parallel. One end of the capacitor C1 which is connected to the negative electrode of the battery 40 is connected to an end of the lower arm of the switching unit arm and the reactor L1 is connected between the end of the capacitor C1 which is connected to the positive electrode of the battery 40 and the switching unit connection point of the switching unit arm.

The DC-DC converter 15 has a function of adjusting the direct current power which is charged in the battery 40. Therefore, in the device of FIG. 13, a charging control mechanism in the ground-side device 200 is not required.

In this device, when the battery 40 is charged from the ground-side device 200 in the contactless power feeding manner, the drive circuit 57 connects the switch circuit 61, the drive circuit 51 connects the cut-off circuit 30, and a drive circuit 54 and a drive circuit 55 set the semiconductor switching element of each of the switching units of the inverters 18 and 28 to be turned off. Therefore, similarly to the circuit of FIG. 11, the voltage-doubler rectifying circuit is formed by two capacitors C11 and C12 of the capacitor arm 16 and two freewheeling diodes D21 and D22 of the inverter 18 and the alternating current power received by the power reception coil 73 is converted into the direct current by the voltage-doubler rectifying circuit to be output.

In this case, a drive circuit 52 which drives the DC-DC converter 15 allows the semiconductor switching element Tr2 of the lower arm of the switching unit arm to be turned off and performs the PWM control on the semiconductor switching element Tr1 of the upper arm to switch the semiconductor switching element Tr1 to be turned on/off. In this case, the DC-DC converter 15 functions as a step-down chopper and outputs a dropped direct current voltage. The battery 40 is charged by the direct current voltage dropped by the DC-DC converter 15.

As described above, the DC-DC converter 15 adjusts the direct current power (the direct current voltage and the direct current) which is supplied to the battery 40 when the battery 40 is charged.

In this case, the control unit 56 calculates the remaining battery level (SOC) of the battery 40 based on a voltage detection result of the voltage sensor 71 and a current detection result of the current sensor 72, controls the duty ratio of the semiconductor switching element Tr1 of the DC-DC converter 15 in accordance with the remaining battery level, and adjusts the charging power which is supplied to the battery 40. For example, when the remaining battery level is lower than a predetermined value, the control unit 56 performs constant current control on the current which is supplied to the battery 40, and rapidly charges the battery 40. Further, when the remaining battery level is increased to be higher than a predetermined value, the control unit 56 performs the constant voltage control to decrease the charging power to prevent overcharge.

Further, when the first motor generator MG1 or the second motor generator MG2 runs with the power of the battery 40, the drive circuit 57 sets the switch circuit 61 to be turned off and the drive circuit 51 connects the cut-off circuit 30. Further, the drive circuits 54 and 55 which drive the inverters 18 and 28 connected to the running motor generator MG performs PWM control on each of the semiconductor switching elements of the inverters 18 and 28 so as to convert the direct current power input to the inverters 18 and 28 into the three phase alternating current power.

In this case, the drive circuit 52 which drives the DC-DC converter 15 allows the semiconductor switching element Tr1 of the upper arm of the switching unit arm to be turned off and performs the PWM control on the semiconductor switching element Tr2 of the lower arm to switch the semiconductor switching element Tr2 to be turned on/off. In this case, the DC-DC converter 15 functions as a boost chopper and boosts the direct current voltage output from the battery 40.

The boosted direct current voltage is smoothened by the capacitors C11 and C12 to be input to the inverters 18 and 28 and then converted into the three phase alternating current power by the inverters 18 and 28 to be output to the motor generators MG1 and MG2.

Further, when the first motor generator MG1 or the second motor generator MG2 is regenerated, the inverters 18 and 28 which are connected to the motor generator MG are controlled to convert the three phase alternating current power into the direct current power and the converted direct current power is smoothened by the capacitors C11 and C12 to be input to the DC-DC converter 15.

In this case, similarly to the case when the battery 40 is charged from the ground-side device, the DC-DC converter 15 is controlled so as to function as a step-down chopper by the drive circuit 52, the direct current voltage which is adjusted to be dropped is output from the DC-DC converter 15, and the battery 40 is charged by the direct current power.

Further, here, in order to output the alternating current power to the motor generator MG, the inverters 18 and 28 which may convert the direct current power into the three phase alternating current power are used. However, in the present invention, if a power converter includes at least one switching unit arm in which two switching units formed of the semiconductor switching element and the freewheeling diode are connected in series and has a function of converting the direct current into the alternating current and the alternating current into the direct current, the power converter may be used.

Further, here, even though the DC-DC converter 15 is used to drop the battery charging voltage and boost the battery output voltage, in the present invention, if a power converter is capable of dropping and boosting the direct current voltage, the power converter may be used.

INDUSTRIAL APPLICABILITY

The contactless power transfer system of the present invention has a high power feeding efficiency, the reduced cost, and a good connectivity with a commercial power supply. Further, the voltage which is applied to the secondary battery is easily adjusted. The contactless power transfer system may be widely used for a moving body such as a vehicle, a carrier, or a moving robot.

REFERENCE SIGNS LIST

10B VEHICLE DRIVING DEVICE
13, 14 ALTERNATING CURRENT LINE
15 DC-DC CONVERTER
16 CAPACITOR ARM
17, 18, 19 INVERTER
21, 22, 23 SWITCHING UNIT ARM
30 CUT-OFF CIRCUIT
31 RELAY
32 AUXILIARY RELAY
33 RESISTOR
34 RELAY
40 BATTERY
40a POSITIVE TERMINAL
40b NEGATIVE TERMINAL
51, 52, 53, 54, 55, 57 DRIVE CIRCUIT
61 SWITCH CIRCUIT
71 VOLTAGE SENSOR
72 CURRENT SENSOR
73 POWER RECEPTION COIL
74 PARALLEL CAPACITOR
75 BMS
83 POWER SUPPLY UNIT
84 CONTROLLER
85 POWER TRANSMISSION COIL
86 CAPACITOR
90 COMMERCIAL POWER SUPPLY
100 VEHICLE
110 VARIABLE VOLTAGE RECTIFIER (BRIDGELESS HIGH POWER FACTOR BOOST RECTIFIER)
120 INVERTER (HALF-BRIDGE INVERTER)
130 CONTACTLESS POWER TRANSFORMER
131 POWER TRANSMISSION COIL
132 SERIAL CAPACITOR
133 POWER RECEPTION COIL
134 PARALLEL CAPACITOR
140 RECTIFIER (VOLTAGE-DOUBLER RECTIFIER)
150 TRANSFORMER
151 SECONDARY BATTERY
152 INVERTER
153 MOTOR
154 ENGINE
160 HIGH POWER FACTOR BOOST RECTIFIER
171 SEMICONDUCTOR SWITCH DRIVING UNIT
172 PULSE WIDTH MODULATION BRIDGELESS RECTIFIER CONTROL UNIT
173 CONSTANT VOLTAGE CONTROL UNIT
174 SEMICONDUCTOR SWITCH DRIVING UNIT
175 SQUARE-WAVE INVERTER CONTROL UNIT
176 CONSTANT CURRENT CONTROL UNIT

177 SECONDARY BATTERY CHARGING CONTROL UNIT
200 GROUND-SIDE DEVICE

The invention claimed is:

1. A contactless power transfer system in which a high frequency alternating current power supply is connected to a primary side of a contactless power transformer and a rectifier which converts a secondary-side alternating current output into a direct current is connected to a secondary side of the contactless power transformer, wherein the high frequency alternating current power supply is formed of a half-bridge inverter and the half-bridge inverter is connected to the primary side of the contactless power transformer through a series capacitor, the rectifier is formed of a voltage-doubler rectifier and the voltage-doubler rectifier is connected to the secondary side of the contactless power transformer through a parallel capacitor, the voltage-doubler rectifier includes:

a capacitor arm in which two capacitors C1 and C2 are connected in series, a first diode D1 which is inserted between one end of the capacitor arm and one end of a secondary-side circuit of the contactless power transformer so as to make the capacitor arm the forward side, and a second diode D2 which is inserted between another end of the capacitor arm and the one end of the secondary-side circuit so as to make the capacitor arm the reverse direction side, and a central point of the capacitor arm is connected to another end of the secondary-side circuit, wherein the primary side of the contactless power transformer is provided on the ground and the secondary side is provided in a moving body, wherein the moving body in which the secondary side of the contactless power transformer is provided includes a first power converter having a function of converting a direct current into an alternating current and a function of converting the alternating current into the direct current, a secondary battery which is charged by the direct current converted by the first power converter, two capacitors which are interposed between the secondary battery and the first power converter, and a rotating electrical machine which is driven by the alternating current converted by the first power converter, the first power converter includes at least one of switching unit arms in which two switching units formed of a semiconductor switching element and a freewheeling diode are connected in series, and when the secondary battery is charged by the secondary-side alternating current output of the contactless power transformer, semiconductor switching elements of all switching units which constitute the first power converter are off, and a voltage-doubler rectifier is formed by a freewheeling diode of the two switching units which are connected in series and the two capacitors.

2. The contactless power transfer system according to claim 1, further comprising:

a high power factor boost rectifier which is used as a direct current power supply of the half-bridge inverter.

3. The contactless power transfer system according to claim 2, wherein an output voltage of the voltage-doubler rectifier is adjusted by adjusting an output voltage of the high power factor boost rectifier.

4. The contactless power transfer system according to claim 3, further comprising:

a constant voltage control circuit which performs constant-voltage control on the high power factor boost rectifier having the output voltage of the half-bridge inverter or the voltage-doubler rectifier as a feedback input, wherein a conduction ratio of the high power factor boost rectifier is controlled based on the output voltage of the constant voltage control circuit.

5. The contactless power transfer system according to claim 3, further comprising:

a constant current control circuit which performs constant current control on the high power factor boost rectifier having an output current of the half-bridge inverter or the voltage-doubler rectifier as a feedback input, wherein a conduction ratio of the high power factor boost rectifier is controlled based on the output voltage of the constant current control circuit.

6. The contactless power transfer system according to claim 2, wherein the high power factor boost rectifier is a bridgeless high power factor boost rectifier which does not have a bridge.

7. The contactless power transfer system according to claim 1, wherein an output of the voltage-doubler rectifier is connected to a secondary battery and a series of control required to charge the secondary battery is controlled by controlling the conduction ratio of the high power factor boost rectifier.

8. The contactless power transfer system according to claim 1, further comprising:

a second power converter, which is capable of boosting and dropping a direct current voltage, provided between the secondary battery and the two capacitors, wherein when the first power converter converts the direct current output of the secondary battery into the alternating current to drive the rotating electrical machine, the second power converter boosts the direct current voltage of the secondary battery to output the boosted direct current voltage to the first power converter and when the secondary battery is charged, the second power converter drops the direct current voltage output from the voltage-doubler rectifier in accordance with a remaining battery level of the secondary battery to output the direct current voltage to the secondary battery.

* * * * *